United States Patent
Kim et al.

(10) Patent No.: US 11,561,399 B2
(45) Date of Patent: Jan. 24, 2023

(54) FOURIER-BEAM SHAPER AND DISPLAY APPARATUS INCLUDING THE SAME

(71) Applicants: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

(72) Inventors: Young Kim, Yongin-si (KR); Hongseok Lee, Seoul (KR); Seokho Song, Seoul (KR); Jungkwuen An, Suwon-si (KR); Kanghee Won, Seoul (KR); Changkun Lee, Seoul (KR)

(73) Assignees: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 111 days.

(21) Appl. No.: 16/919,987

(22) Filed: Jul. 2, 2020

(65) Prior Publication Data
US 2021/0003852 A1    Jan. 7, 2021

(30) Foreign Application Priority Data

Jul. 5, 2019  (KR) .......................... 10-2019-0081521
Jun. 9, 2020  (KR) .......................... 10-2020-0069848

(51) Int. Cl.
*G02B 27/01*    (2006.01)
*G02B 27/09*    (2006.01)
(Continued)

(52) U.S. Cl.
CPC .......... *G02B 27/0172* (2013.01); *G02B 5/18* (2013.01); *G02B 27/0081* (2013.01); *G02B 27/0101* (2013.01); *G02B 27/0103* (2013.01); *G02B 27/09* (2013.01); *G02B 27/0927* (2013.01); *G02B 27/0938* (2013.01); *G02B 27/0944* (2013.01); *G02B 2027/0178* (2013.01)

(58) Field of Classification Search
CPC ................ G02B 27/0081; G02B 27/01; G02B 27/0101; G02B 27/0103; G02B 27/017;
(Continued)

(56) References Cited

U.S. PATENT DOCUMENTS 1,016,853  A    2/1912   Ruff
9,778,556  B2   10/2017  Khromov et al.
(Continued)

FOREIGN PATENT DOCUMENTS

KR  101718777 B1  3/2017
WO  2016/142707 A1  9/2016
WO  2019/067100 A1  4/2019

OTHER PUBLICATIONS

Communication dated Nov. 13, 2020 issued by the European Patent Office in European Application No. 20183932.1.

*Primary Examiner* — Jason M Mandeville
(74) *Attorney, Agent, or Firm* — Sughrue Mion, PLLC

(57) ABSTRACT

Provided are a Fourier-beam shaper and a display apparatus including the Fourier-beam shaper. The Fourier-beam shaper includes: a waveguide; an input coupler configured to direct a plurality of light beams toward the waveguide in a time-sequential manner; and a spatial converter configured to output the plurality of light beams traveling in the waveguide through spatially different regions of the spatial converter.

23 Claims, 15 Drawing Sheets

(51) Int. Cl.
*G02B 27/00* (2006.01)
*G02B 5/18* (2006.01)

(58) Field of Classification Search
CPC ............... G02B 27/0172; G02B 27/09; G02B 27/0927; G02B 27/0938; G02B 27/0944; G02B 27/4233; G02B 2027/0178; G02B 5/18; G02B 5/1804; G02B 5/1819; G02B 6/124
USPC .......................................................... 345/8
See application file for complete search history.

(56) References Cited

U.S. PATENT DOCUMENTS

| | | |
|---|---|---|
| 10,168,531 B1 | 1/2019 | Trail et al. |
| 2009/0040580 A1 | 2/2009 | Mukawa |
| 2011/0109880 A1* | 5/2011 | Nummela ............... G06F 3/013 351/210 |
| 2014/0140654 A1* | 5/2014 | Brown ............... G02B 27/0172 385/10 |
| 2014/0300966 A1* | 10/2014 | Travers ............... G03H 1/2205 359/558 |
| 2015/0160529 A1 | 6/2015 | Popovich et al. |
| 2017/0052374 A1 | 2/2017 | Waldern et al. |
| 2018/0101018 A1* | 4/2018 | Chung ................... G02B 30/27 |
| 2018/0129105 A1 | 5/2018 | Kim et al. |
| 2018/0284440 A1 | 10/2018 | Popovich et al. |
| 2019/0056635 A1 | 2/2019 | Kim et al. |
| 2019/0064420 A1 | 2/2019 | Lee et al. |
| 2019/0113802 A1 | 4/2019 | Won et al. |
| 2019/0147809 A1 | 5/2019 | Kim et al. |
| 2019/0258069 A1 | 8/2019 | Song et al. |

\* cited by examiner

FOURIER-BEAM SHAPER AND DISPLAY APPARATUS INCLUDING THE SAME

CROSS-REFERENCE TO RELATED APPLICATION(S)

This application claims priority to Korean Patent Application No. 10-2019-0081521, filed on Jul. 5, 2019, and Korean Patent Application No. 10-2020-0069848, filed on Jun. 9, 2020, in the Korean Intellectual Property Office, the disclosures of which are incorporated by reference herein in their entireties.

BACKGROUND

1. Field

Example embodiments relate of the present disclosure relate to a Fourier-beam shaper and a display apparatus including the Fourier-beam shaper.

2. Description of Related Art

Recently, along with the development of electronic apparatuses and display apparatuses capable of implementing virtual reality (VR), interest in such apparatuses has increased. As a next step of VR, technology (or methods) for implementing augmented reality (AR) and mixed reality (MR) has been researched.

Unlike VR that is based on a complete virtual world, AR is a display technique that shows the real world together with virtual objects or information superimposed on (or combined with) the real word, thereby further increasing the effect of reality. While VR is limitedly applied only to fields such as games or virtual experience, AR is advantageous in that it may be applied to various reality environments. In particular, AR attracts attention as next-generation display technology suitable for a ubiquitous environment or an Internet of things (IoT) environment. AR may be an example of MR in that AR shows a mixture of the real world and additional information (e.g., virtual world).

Such image system projects generated images onto the eyes of a user using an optical system. In general, the optical system uses a lens, and an image system requires a distance between a spatial light modulator and the lens and a distance between the lens and the eyes of a user in order to project an image onto the eyes of the user. However, this increases the volume of the image system.

SUMMARY

Provided are a Fourier-beam shaper and a display apparatus including the Fourier-beam shaper having a relatively simple structure.

In accordance with an aspect of an example embodiment, there is provided an Fourier-beam shaper, including: a waveguide; an input coupler configured to direct a plurality of light beams toward the waveguide; and a spatial converter configured to output the plurality of light beams traveling in the waveguide through spatially different regions of the spatial converter.

The spatial converter may be further configured to output the plurality of light beams in a plurality of directions.

The spatial converter may be further configured to output at least two of the plurality of light beams in different directions.

The spatial converter may include a plurality of selective transmission elements arranged in a first direction, the first direction crossing directions in which the plurality of light beams are output, and each of the plurality of selective transmission elements may be configured to transmit one of the plurality of light beams to an external space and not to transmit remaining light beams of the plurality of light beams to the external space.

Each of the plurality of selective transmission elements may be further configured to selectively transmit the plurality of light beams according to an optical characteristic of each of the plurality of selective transmission elements.

The optical characteristic may include a diffraction characteristic.

At least one of a grating structure and a material of at least two of the plurality of selective transmission elements may be different from each other.

Each of the plurality of selective transmission elements may be further configured to selectively transmit the plurality of light beams according to an electrical signal applied to each of the plurality of selective transmission elements.

The input coupler may be further configured to direct the plurality of light beams that are incident on the input coupler at different incident angles.

The spatial converter may be further configured to output the plurality of light beams through the spatially different regions of the spatial converter based on incident angles of the plurality of light beams.

The spatial converter may be further configured to focus the plurality of light beams respectively at different positions in an external space.

A frame image may be provided to a user based on the focused plurality of light beams.

Each of the plurality of light beams may correspond to a partial image of a frame image.

Each of the plurality of light beams may correspond to a pixel image of the frame image.

Sizes of the plurality of light beams output from the spatial converter may be different from sizes of the plurality of light beams incident on the input coupler.

The sizes of the plurality of light beams output from the spatial converter may be greater than the sizes of the plurality of light beams incident on the input coupler.

The input coupler may include: a first input coupler configured to direct first light beams of the plurality of light beams toward the waveguide; and a second input coupler configured to direct second light beams of the plurality of light beams toward the waveguide.

The first light beams and the second light beams may be synchronously and respectively incident on the first input coupler and the second input coupler.

The waveguide may include a first waveguide in which the first light beams travel; and a second waveguide in which the second light beams travel.

The spatial converter may include a first spatial converter arranged on the first waveguide and configured to output the first light beams through different regions of the first spatial converter; and a second spatial converter arranged on the second waveguide and configured to output the second light beams through different regions of the second spatial converter.

The first spatial converter may be further configured to form a first sub-frame image in a first region of an external space, and the second spatial converter may be further configured to form a second sub-frame image in a second region of the external space, the second region being different from the first region.

The first sub-frame image and the second sub-frame image may correspond to different portions of a frame image.

According to an aspect of an example embodiment, there is provided a display apparatus including a Fourier-beam shaper and a light source. The Fourier-beam shaper includes: a waveguide; an input coupler configured to direct a plurality of light beams toward the waveguide; and a spatial converter configured to output the plurality of light beams traveling in the waveguide through spatially different regions of the spatial converter. The light source is configured to output the plurality of light beams to the Fourier-beam shaper.

The display apparatus may further include an exit pupil expander configured to expand the plurality of light beams output from the Fourier-beam shaper.

The exit pupil expander may be further configured to transmit light corresponding to a reality environment.

The display apparatus may further include a spatial light modulator configured to add image information to the plurality of light beams output from the Fourier-beam shaper or the light source.

The display apparatus may further include a direction adjustment member configured to adjust incident angles of the plurality of light beams incident on the Fourier-beam shaper.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
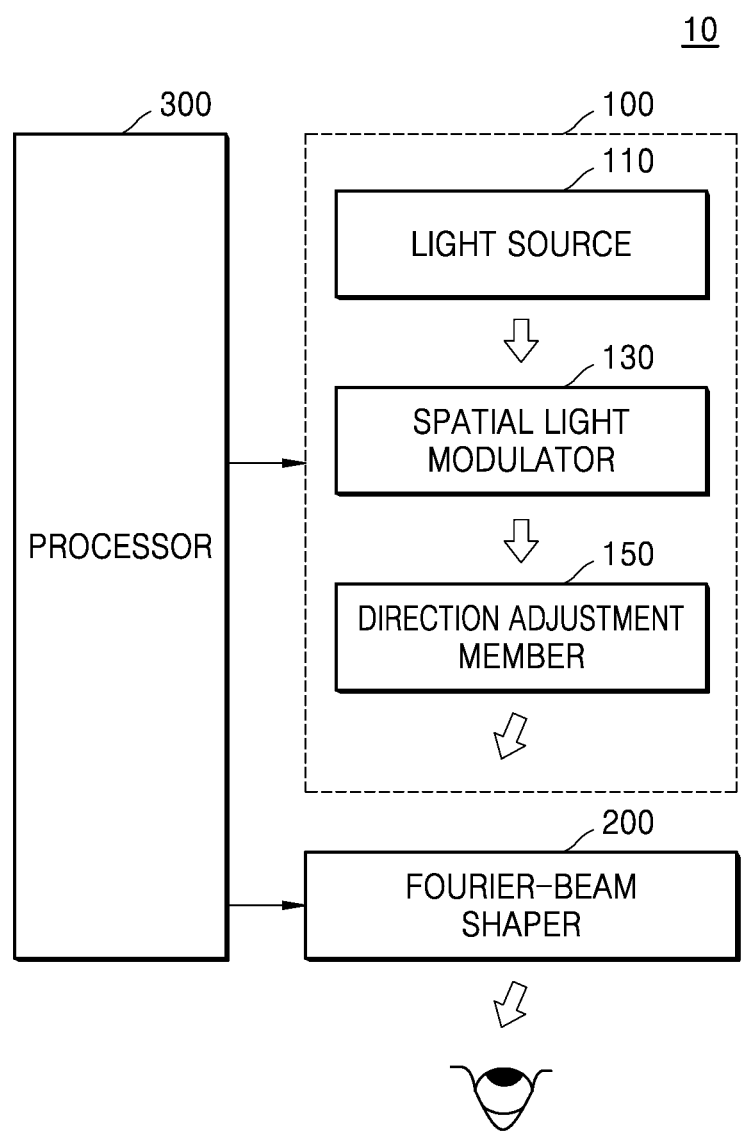
FIG. 1 is a schematic view illustrating a display apparatus including a Fourier-beam shaper according to an example embodiment.

Reference will now be made in detail to embodiments, examples of which are illustrated in the accompanying drawings, wherein like reference numerals refer to like elements throughout. The example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression "at least one of a, b, and c," should be understood as including only a, only b, only c, both a and b, both a and c, both b and c, or all of a, b, and c.

In the following description, when an element is referred to as being "above", "on", "connected to" or "coupled to" another element, it may be directly above, on, connected to, or coupled to the other element while making contact with the other element or may be above, on, connected to, or coupled to the other element without making contact with the other element (that is, intervening element(s) may be present).

The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Terms such as "first" and "second" may be used to describe various elements, but these elements should not be limited by these terms. These terms are only used to distinguish one element from another.

Figure 2:
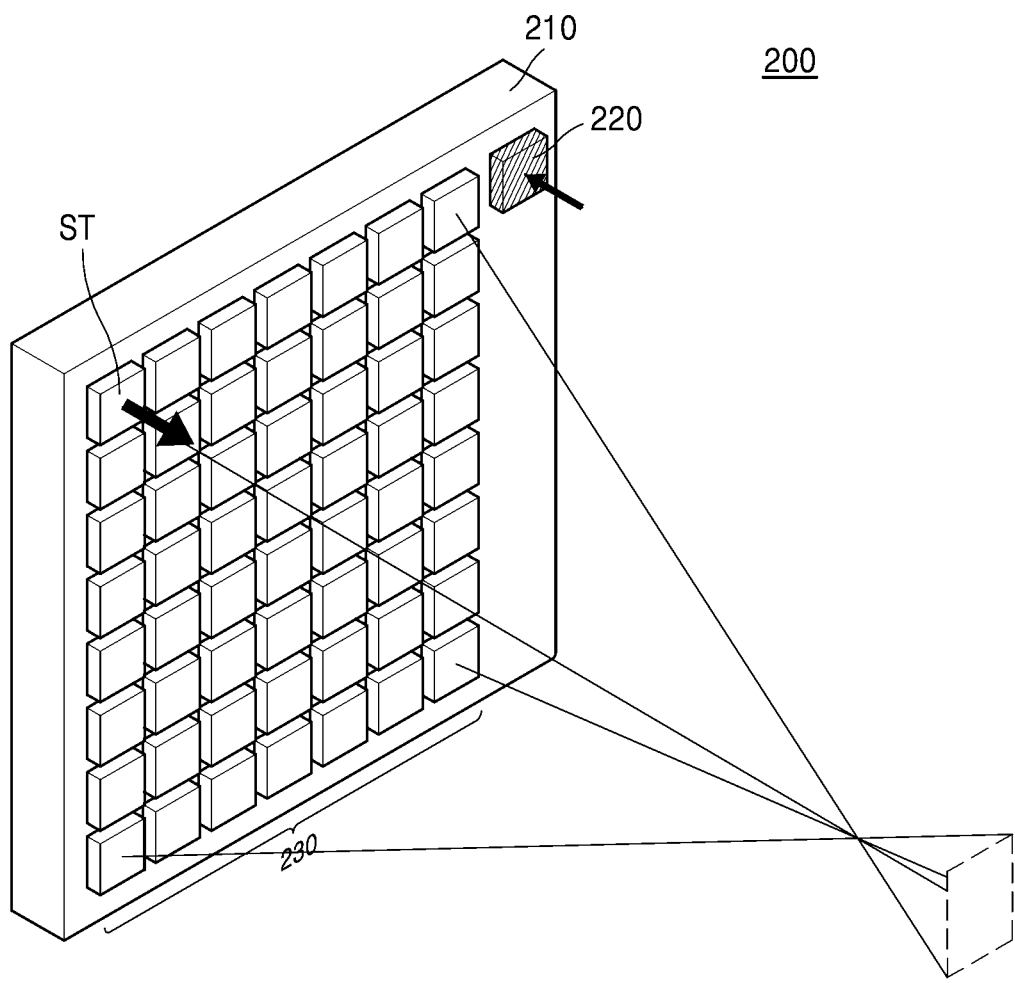
FIG. 2 is a view illustrating a structure of the Fourier-beam shaper shown in FIG. 1.

FIG. 1 is a schematic view illustrating a display apparatus 10 including a Fourier-beam shaper 200 according to an example embodiment, and FIG. 2 is a view illustrating a structure of the Fourier-beam shaper 200 shown in FIG. 1.

Referring to FIG. 1, the display apparatus 10 may include: a beam output device 100 that outputs a plurality of light beams; the Fourier-beam shaper 200 that receives the plurality of light beams and outputs the plurality of light beams respectively through spatially different regions of the Fourier-beam shaper 200; and a processor 300 that controls the beam output device 100 and/or the Fourier-beam shaper 200 to display an image based on the plurality of light beams.

The beam output device 100 may time-sequentially output a plurality of light beams. Here, each light beam may correspond to a partial image of a frame image. For example, a light beam corresponds to a pixel image of a frame image or may correspond to a sum of a plurality of pixel images included in a frame image. Light beams may be of light in which different frequencies are mixed. For example, light beams may be of light in which red light, green light, and blue light are mixed.

The beam output device 100 may include a light source 110 and a spatial light modulator 130. The light source 110 may provide coherent light. The light source 110 may include a laser diode. However, the light source 110 is not limited thereto, and light having a certain degree of spatial coherence may be diffracted and modulated by the spatial light modulator 130 such that the light may have coherence, and thus another light source may be used as long as the light source is capable of emitting light having a certain degree of spatial coherence.

The light source 110 may include a plurality of light sources that output light having different wavelengths. For example, the light source 110 may include a first light source that outputs light in a first wavelength band, a second light source that outputs light in a second wavelength band different from the first wavelength, and a third light source that outputs light in a third wavelength band different from the first and the second wavelength bands. The first, the second, and the third wavelength bands may respectively correspond to red light, green light, and blue light.

The spatial light modulator 130 may output light having image information by modulating light output from the light source 110 under the control of the processor 300. The resolution of modulated light may be determined based on the spatial resolution of the spatial light modulator 130. For example, when the spatial light modulator 130 is constituted by one pixel, modulated light corresponds to a pixel image. Alternatively, when the spatial resolution of the spatial light modulator 130 is 2×2, the resolution of modulated light may also be 2×2. The spatial light modulator 130 may output light corresponding to a two-dimensional (2D) image, or a three-dimensional (3D) image or a hologram image having different depth information.

The spatial light modulator 130 may include, for example, an amplitude-modulation spatial light modulator, a phase-modulation spatial light modulator, or a complex spatial light modulator that modulates both an amplitude and a phase. In addition, the spatial light modulator 130 may include, for example, a transmissive light modulator, a reflective light modulator, or a transflective light modulator. For example, the spatial light modulator 130 may include a liquid crystal on silicon (LCoS) panel, a liquid crystal display (LCD) panel, a digital light projection (DLP) panel, an organic light emitting diode (OLED) panel, or a micro-organic light emitting diode (M-OLED) panel. Here, the DLP panel may include a digital micromirror device (DMD).

The beam output device 100 may further include a direction adjustment member 150 that changes the traveling path of light output from the spatial light modulator 130 such that the light may be incident on the Fourier-beam shaper 200 at a given angle. The direction adjustment member 150 may be an actuator for adjusting the position of the spatial light modulator 130 to change the traveling path of light, or may be an optical device for directly changing the traveling path of light output from the spatial light modulator 130. The optical device may be an active optical device capable of differently adjusting the traveling path of light under the control of the processor 300.

Until a plurality of light beams corresponding to one frame image are output, the direction adjustment member 150 may adjust the traveling paths of light beams such that the light beams may proceed in different traveling paths. For example, when the resolution of light beams is 2×2 and the resolution of a frame image is 20×20, the direction adjustment member 150 may control a hundred light beams such that the hundred light beams may proceed in a hundred different traveling paths.

The processor 300 may control the beam output device 100 to output light. An output period of light may be determined based on the resolution of a frame image to be formed, the resolution of light modulated by the spatial light modulator 130, and a frame time. For example, when the frame time is 1/60 second and the resolution of light at the spatial light modulator 130 is 1/10 of the resolution of a frame image, the processor 300 may control the beam output device 100 such that light may be output with a period of a 1/(60×10) second.

With reference to FIG. 1, it is described that the spatial light modulator 130 outputs light having image information by modulating light, but example embodiments are not limited thereto. For example, the light source 110 may output light having image information under the control of the processor 300. In this case, the spatial light modulator 130 may not be used, and the direction adjustment member 150 may be an actuator for controlling the position of the light source 110 or an optical device for adjusting the traveling path of light output from the light source 110.

The Fourier-beam shaper 200 may receive a plurality of light beams from the beam output device 100 and may output the plurality of light beams through different regions thereof to form a frame image in an external space. Referring to FIG. 2, the Fourier-beam shaper 200 may include a waveguide 210, an input coupler 220 that guides a plurality of light beams to the inside of the waveguide 210, and an spatial converter 230 configured such that the light beams traveling in the waveguide 210 may be output through spatially different regions of the spatial converter 230.

The waveguide 210 may include a transparent member such as a glass material or a transparent plastic material and sizes of a light beam incident on the waveguide 210 may vary while the light beam travels in the waveguide 210 by total reflection. Thus, the size of a light beam incident on the input coupler 220 may be different from the size of a light beam output through the spatial converter 230. Light output from the beam output device 100 may be dot-type light, but the light traveling in the waveguide 210 may be surface-type light because the beam size of the light increases while being repeatedly totally reflected in the waveguide 210. In addition, light may be uniformly distributed while traveling in the waveguide 210. Thus, the size of a light beam output through the spatial converter 230 may be greater than the size of a light beam incident on the input coupler 220.

The input coupler 220 may be arranged in a region of the waveguide 210. In FIG. 2, the input coupler 220 is illustrated as being located on an edge portion of the upper surface of the waveguide 210, but is not limited thereto. Alternatively, the input coupler 220 may be arranged in a lower region of the waveguide 210. The input coupler 220 may include a diffraction member BD that diffracts and transmits light incident on the input coupler 220. For example, the input coupler 220 may include a grating structure. The input coupler 220 may have diffraction characteristics to diffract and transmit incident light regardless of the incident angle of the incident light.

The spatial converter 230 may include a plurality of selective transmission elements ST such that a plurality of light beams traveling in the waveguide 210 may be output through spatially different regions of the spatial converter 230. The selective transmission elements ST may be two-dimensionally arranged on the waveguide 210. The selective transmission elements ST may be continuously arranged or discontinuously arranged.

Each of the selective transmission elements ST may transmit one of a plurality of light beams to the outside and may block the remaining light beams of the plurality of light beams. Each of the selective transmission elements ST may transmit or may not transmit light according to the optical characteristics thereof. For example, each of the selective transmission elements ST may transmit or may not transmit light according to the diffraction characteristics thereof. Alternatively, each of the selective transmission elements ST may transmit or may not transmit light as the optical characteristics thereof are changed by an electrical signal applied to the selective transmission elements ST.

Each of the plurality of selective transmission elements ST may direct light in a specific direction and output the light. For example, at least two of the selective transmission elements ST may direct and output light in different directions when light passing therethrough. The degree of directivity of the selective transmission elements ST may be determined by optical characteristics of the selective transmission elements ST such as diffraction characteristics, and the optical characteristics of the selective transmission elements ST may be changed by an electrical signal applied to the selective transmission elements ST.

The time required for the spatial converter 230 to output all of a plurality of light beams forming a frame image may be equal to the output period of the frame image, that is, a frame time. For example, n light beams corresponding to one frame image may be output at intervals of 1/n of the frame time by the beam output device 100. Each of the plurality of selective transmission elements ST may direct and output one of the n light beams. Based on all of the n light beams that are output, a user may recognize the frame image. Since the n light beams are formed in different regions of an external space, for example, a pupil E of a user, the user may recognize the n light beams as one image.

In the related art structure in which a frame image of the same phase is incident on a waveguide, the distance between the waveguide and a beam output device may need to be equal to or greater than a certain value. However, since the Fourier-beam shaper 200 independently receives light and outputs the light, the distance between the beam output device 100 and the Fourier-beam shaper 200 is not limited. This makes it possible to reduce the distance between the beam output device 100 and the Fourier-beam shaper 200. In addition, since the Fourier-beam shaper 200 forms a frame image by outputting a plurality of light beams through different regions of the Fourier-beam shaper 200, the display apparatus 10 may display the frame image simply by outputting light beams using the beam output device 100. Thus, the light source 110 and the spatial light modulator 130 included in the beam output device 100 may have small sizes. In addition, since each of the selective transmission elements ST of the Fourier-beam shaper 200 directs light in a certain direction, an additional optical device such as a lens may not be required. Therefore, the display apparatus 10 may have a simple structure.

Figure 3:
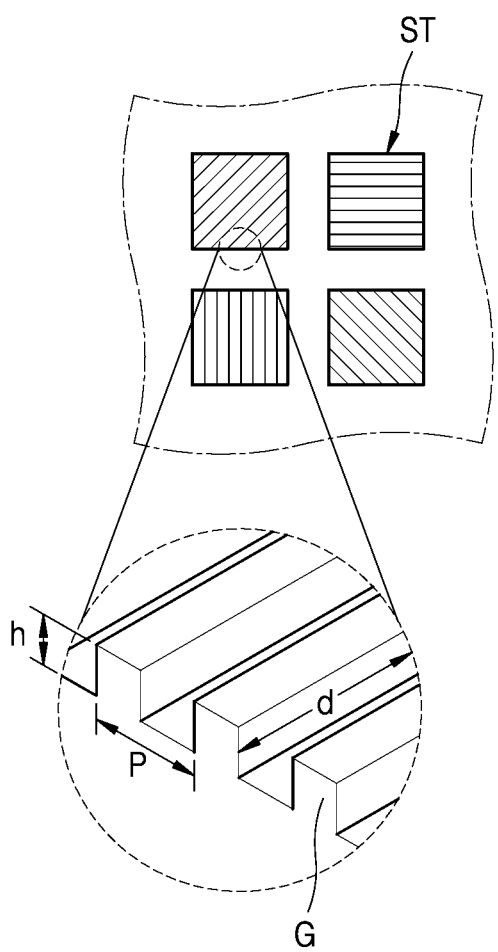
FIG. 3 is a view illustrating examples of selective transmission elements of a spatial converter according to an example embodiment.

FIG. 3 is a view illustrating examples of the selective transmission elements ST of the spatial converter 230 according to an example embodiment.

As shown in FIG. 3, the selective transmission elements ST may include diffraction members having a grating structure. Each of the selective transmission elements ST may have a grating G, and one or more of a shape, a pitch (p), a height (h), a direction (d), a material, and/or the like of the grating G may be varied among the selective transmission elements ST. Thus, the diffraction efficiency of each of the selective transmission elements ST may vary according to the incident angle of light. In FIG. 3, the gratings G of the selective transmission elements ST have different directions, but example embodiments are not limited thereto.

For example, the diffraction efficiency of each of the selective transmission elements ST may be equal to or greater than a first reference value corresponding to light which is incident at a certain incident angle and may be less than a second reference value corresponding to light incident at the other incident angles. Here, the second reference value may be equal to or less than the first reference value. Thus, each of the selective transmission elements ST of the spatial converter 230 may diffract and transmit light incident at a certain incident angle, an may totally reflect, toward the waveguide 210, light incident at an incident angle different from the certain incident angle. Since the selective transmission elements ST are capable of selectively diffracting and transmitting a plurality of light beams, the spatial converter 230 may output light through different regions thereof.

When transmitting light, each of the selective transmission elements ST may output the light in a certain direction. The degree of directivity of each of the selective transmission elements ST may be determined depending on the incident angle of light, the diffraction characteristics of the selective transmission element ST such as the grating structure of the selective transmission element ST, or the material of the selective transmission element ST.

Although it is mentioned that the diffraction characteristics of each of the selective transmission elements ST are dependent on factors such as the shape, pitch (p), height (h), direction (d), or material of the grating (G) of the selective transmission element ST, the selective transmission elements ST are not limited thereto. For example, the diffraction characteristics of the selective transmission elements ST may be varied by an electrical signal applied to the selective transmission elements ST.

Figure 4:
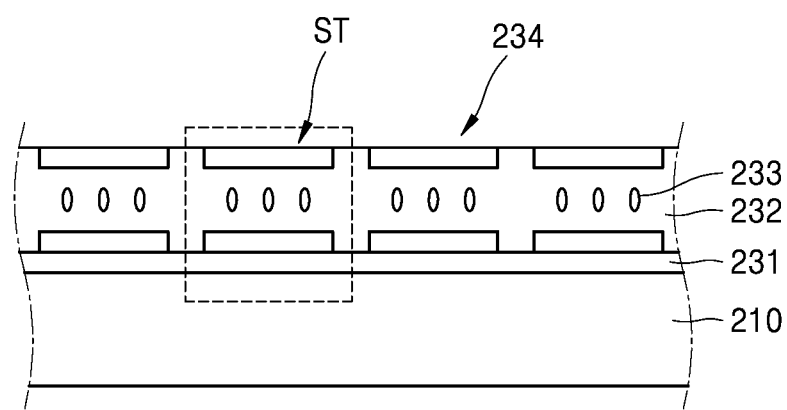
FIG. 4 is a view illustrating a portion of a Fourier-beam shaper including selective transmission elements according to an example embodiment.

FIG. 4 is a view illustrating a portion of a Fourier-beam shaper including selective transmission elements according to another example embodiment.

As shown in FIG. 4, a spatial converter 230 of the Fourier beam shaper may include: an output coupler 231 arranged on a waveguide 210 and the selective transmission elements ST arranged on the output coupler 231. The output coupler 231 may include a grating structure that diffracts and transmits light.

The transmittance of each of the selective transmission elements ST may be varied according to an electrical signal applied thereto. Each of the selective transmission elements ST may include: a base layer 232; a plurality of electro-optical particles 233 which are dispersed in the base layer 232 and have optical characteristics varying according to an electrical signal applied thereto; and electrode portions 234 for applying an electrical signal to the electro-optical particles 233.

The base layer 232 may include a transparent polymer material. For example, the base layer 232 may include a transparent cured resin.

The electro-optical particles 233 may include materials having an electro-optical effect. The electro-optical effect refers to a phenomenon in which optical characteristics are varied according to an electric field, and the characteristics of the electro-optical particles 233, such as refractive index, phase retardation, or polarization characteristics, may be varied depending on the existence of an electric field and/or the strength of an electric field.

The electro-optical particles 233 may include liquid crystal. At least one of the refractive index and polarization characteristics of the liquid crystal may be varied according to the existence of an electric field and/or the strength of the electric field. For example, the electro-optical particles 233 may include polymer dispersed liquid crystal (PDLC), polymer network liquid crystal (PNLC), cholesteric liquid crystal, smectic liquid crystal, or the like.

When an electric field is applied to the base layer 232, the electro-optical particles 233 may refract incident light equally, and thus, the electro-optical particles 233 may be transparent. Thus, the electro-optical particles 233 may transmit incident light. That is, when an electrical signal is applied to the selective transmission elements ST, the selective transmission elements ST enter into a transmission mode and transmit light.

Conversely, when no electric field is applied to the base layer 232, the electro-optical particles 233 refracts incident light with different refractive indexes in different directions according to the position (or an incident angle) of the incident light, and thus the electro-optical particles 233 may be opaque. Thus, the electro-optical particles 233 may not transmit incident light by scattering the incident light. That is, when no electrical signal is applied to the selective transmission elements ST, the selective transmission elements ST enter into a non-transmission mode and do not transmit light.

In another example, when an electric field is applied to the electro-optical particles 233, the electro-optical particles 233 may enter into a non-transmission mode in which the electro-optical particles 233 refract light with different refractive indexes in different directions according to the position of the light, and when no electric field is applied to the electro-optical particles 233, the electro-optical particles 233 may enter into a transmission mode in which the electro-optical particles 233 refract light equally.

In an example embodiment, according to an electrical signal applied to the selective transmission elements ST, one of the selective transmission elements ST may enter into a transmission mode to output light diffracted from the output coupler 231, and another one of the selective transmission elements ST may enter into a non-transmission mode so as not to output light diffracted from the output coupler 231. An electrical signal may be synchronized with light output from the beam output device 100, and the selective transmission elements ST are capable of selectively transmitting light based on the electric signal. Thus, the spatial converter 230 may output light through spatially different regions thereof.

Figure 5:
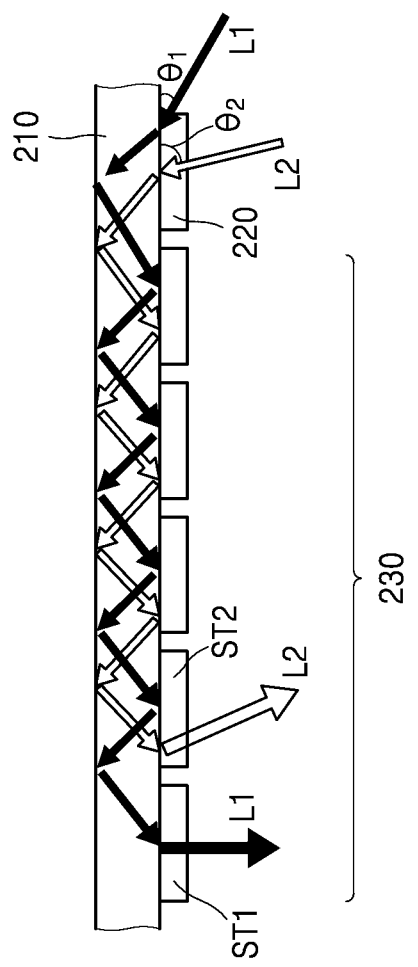
FIG. 5 is a view illustrating a method of selectively outputting a plurality of light beams through a plurality of selective transmission elements according to an example embodiment.

FIG. 5 is a view illustrating a method of selectively outputting a plurality of light beams through a plurality of selective transmission elements ST according to an example embodiment.

As illustrated in FIG. 5, light may be incident on an input coupler 220 at a certain incident angle. The input coupler 220 diffracts and transmits the light to a waveguide 210. While traveling in the waveguide 210, the light may pass through one of the selective transmission elements ST which satisfies certain conditions, but may not pass through another one of the selective transmission elements ST.

For example, when the selective transmission elements ST are constituted by diffraction members having different diffraction characteristics, a selective transmission element ST having low diffraction efficiency with respect to the incident angle of light may totally reflect the incident light into the waveguide 210, and a selective transmission element ST having high diffraction efficiency with respect to the incident angle of the light may diffract and transmit the incident light. Thus, the light may be output to the outside only through a portion of the selective transmission elements ST. For example, when a light beam L1 is incident at a first incident angle θ1, a first selective transmission element ST1 having high diffraction efficiency with respect to the first incident angle θ1 may diffract and transmit the light beam L1 but the other selective transmission elements ST may totally reflect the light beam L1 into the waveguide 210. For example, when a light beam L2 is incident at a second incident angle θ2, a second selective transmission element ST2 having high diffraction efficiency with respect to the second incident angle θ2 may diffract and transmit the light beam L2 but the other selective transmission elements ST may totally reflect the light beam L2 into the waveguide 210.

Alternatively, when the selective transmission elements ST include electro-optical particles 233 of which optical characteristics are varied by an electrical signal applied thereto, a selective transmission element ST entered into a transmission mode by an electrical signal may transmit incident light, and a selective transmission element ST entered into a non-transmission mode by the electrical signal may not transmit the incident light. Thus, the light may be output to the outside only through the selective transmission element ST which is in the transmission mode.

For example, the light beam L1 which is incident at a first incident angle 61 may pass through the first selective transmission element ST1 which is in the transmission mode, but may be scattered or totally reflected into the waveguide 210 by the other selective transmission elements ST which are in the non-transmission mode. In addition, a light beam L2 which is incident at a second incident angle 61 may pass through the second selective transmission element ST2 which is in the transmission mode, but may be scattered or totally reflected into the waveguide 210 by the other selective transmission elements ST which are in the non-transmission mode.

Figure 6:
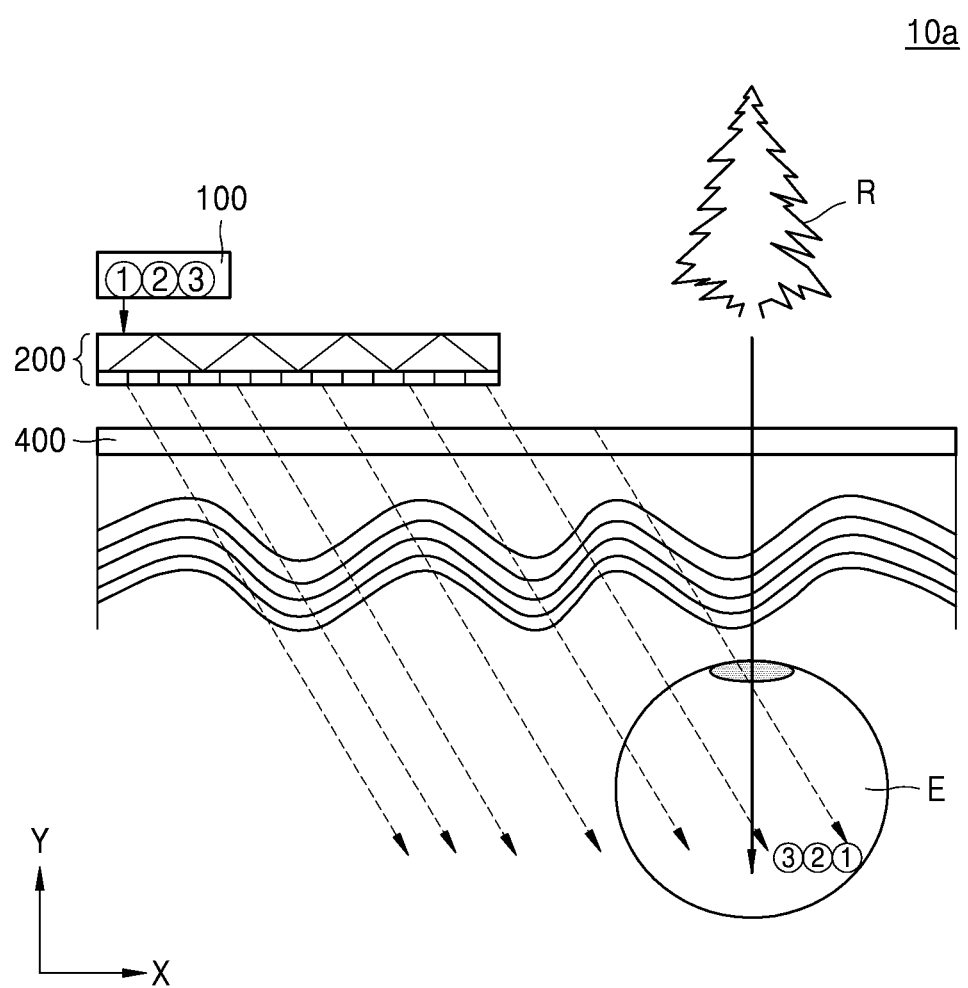
FIG. 6 is a view illustrating a display apparatus according to an example embodiment.

FIG. 6 is a view illustrating a display apparatus 10a according to another example embodiment.

Referring to FIGS. 1 and 6, the display apparatus 10a shown in FIG. 6 may further include an exit pupil expander 400. The exit pupil expander 400 may expand light output from a Fourier-beam shaper 200 in one direction, for example, an x-axis direction. Although not shown in FIG. 6, the exit pupil expander 400 may include a waveguide, an input coupler, and an output coupler. The input coupler and the output coupler of the exit pupil expander 400 may also include diffraction members. However, the input coupler and the output coupler of the exit pupil expander 400 may have diffraction characteristics for diffracting and transmitting light regardless of the incident angle of the light.

In addition, the exit pupil expander 400 may include a transparent material such that light corresponding to a reality environment R, for example, light reflected or generated in the reality environment R may be transmitted to the pupil E of a user through the exit pupil expander 400. Thus, the user may simultaneously recognize a frame image formed by the Fourier-beam shaper 200 and the reality environment R. However, this is a non-limiting example. The exit pupil expander 400 may direct light output from only the Fourier-beam shaper 200 to the pupil E of the user.

Light beams as many as the number of selective transmission elements ST may be required to form one frame image by using a single beam output device 100 and a single Fourier-beam shaper 200. In addition, as the number of light beams increases, the output period of the light beams is shortened. This may increase a signal processing load of a processor 300.

In some example embodiments, a display apparatus may form a frame image by using a plurality of beam output devices and a plurality of Fourier-beam shapers.

Figure 7:
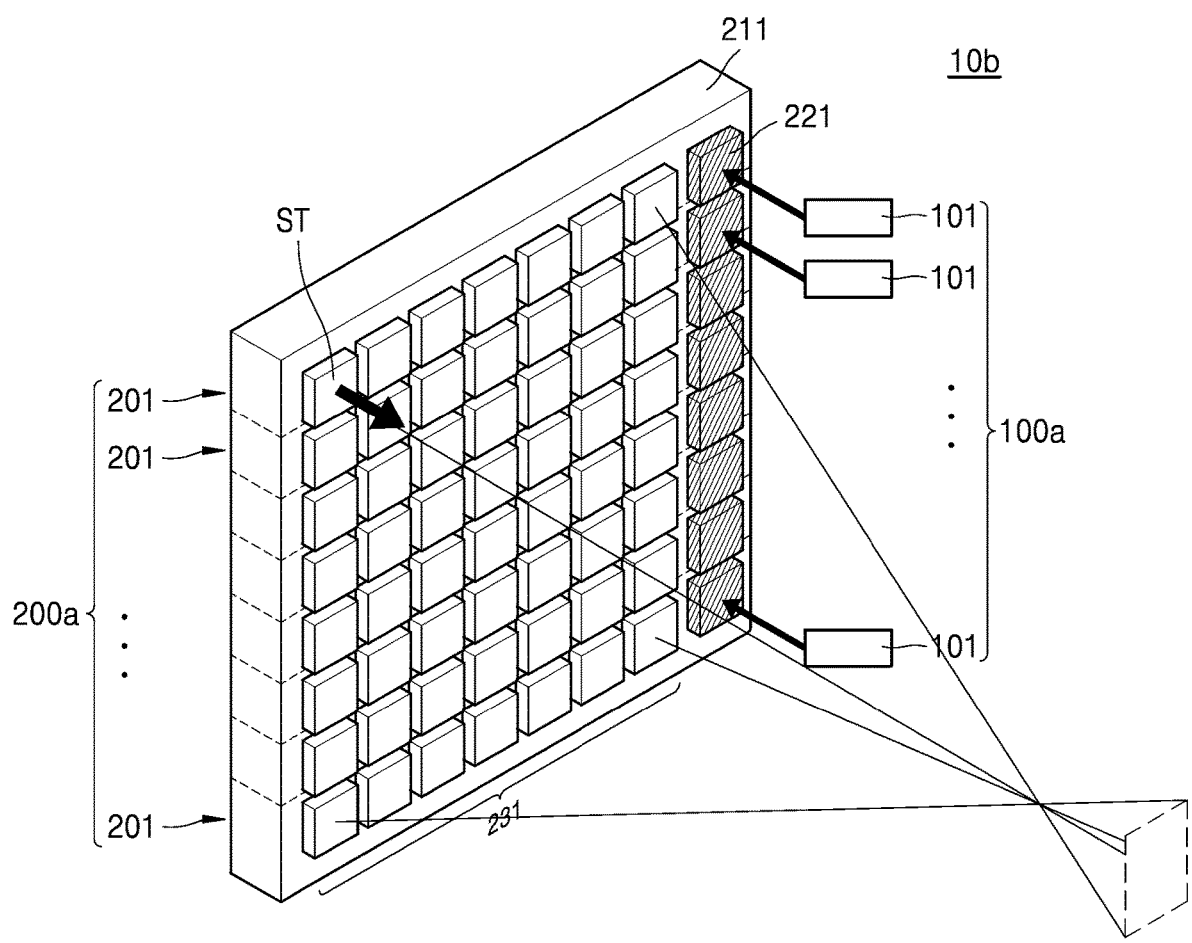
FIG. 7 is a view illustrating a display apparatus according to an example embodiment.

FIG. 7 is a view illustrating a display apparatus 10b according to another example embodiment.

The display apparatus 10b illustrated in FIG. 7 may include a plurality of beam output devices 101 and a plurality of Fourier-beam shapers 201. Each of the plurality of beam output devices 101 may output a plurality of light beams to a corresponding Fourier-beam shaper 201, and one frame image may be formed by a plurality of light beams output from the plurality of Fourier-beam shapers 201.

Each of the beam output devices 101 may include a light source, a spatial light modulator, and/or a direction adjustment member, but is not limited thereto. Each of the beam output devices 101 is substantially the same as the beam output device 100 described with reference to FIG. 1, and thus a detailed description thereof will be omitted.

Each of the Fourier-beam shapers 201 may also include a waveguide 211, an input coupler 221, and a spatial converter 231. The input coupler 221 may be a diffraction member arranged in a region of the waveguide 211 to diffract and transmit incident light. For example, the input coupler 221 may have a grating structure and may have diffraction characteristics to diffract and transmit incident light regardless of the incident angle of the incident light.

The spatial converter 231 may include a plurality of selective transmission elements ST such that a plurality of traveling light beams may be output through spatially different regions (or different selective transmission elements ST) of the spatial converter 231. The selective transmission elements ST may be one-dimensionally arranged on the waveguide 210. However, this is a non-limiting example. Alternatively, the selective transmission elements ST may be two-dimensionally arranged.

The selective transmission elements ST may have different optical characteristics such that light satisfying certain conditions may pass through one or more of the selective transmission elements ST, and light not satisfying the conditions may not pass through the one or more of the selective transmission elements ST. The optical characteristics of the selective transmission elements ST may be determined during a manufacturing process of the selective transmission elements ST or may be varied according to an electrical signal applied to the selective transmission elements ST.

For example, the selective transmission elements ST may have diffraction characteristics. Each of the selective transmission elements ST may diffract and transmit light incident at a certain incident angle, but may totally reflect, into the waveguide 211, light incident at an incident angle different from the certain incident angle. Since the selective transmission elements ST are capable of selectively diffracting and transmitting a plurality of light beams, the spatial converter 231 may output light through different regions thereof.

Alternatively, the selective transmission elements ST may include electro-optical particles 233 of which optical characteristics are varied by an electrical signal applied thereto. Each of the selective transmission elements ST may transmit incident light in a transmission mode and may scatter or totally reflect incident light into the waveguide 211 in a non-transmission mode.

In addition, each of the selective transmission elements ST may direct light in a certain direction while transmitting the light. Thus, a plurality of light beams output from the spatial converters 231 may form a frame image in an external space. The external space may be a space inside the pupil E of a user.

Each of the beam output devices 101 may output a plurality of light beams to a corresponding Fourier-beam shaper 201. The beam output devices 101 may be synchronized to output a plurality of light beams in the same time period, and the Fourier-beam shapers 201 may output a plurality of light beams in the same time period, thereby forming one frame image. For example, each of the Fourier-beam shapers 201 may form a line frame image by outputting light through different regions thereof, and one frame image may be formed by line frame images respectively formed by the Fourier-beam shapers 201.

Each of the beam output devices 101 may output light beams as many as the number of selective transmission elements ST of a corresponding Fourier-beam shaper 201, and one frame may be formed by a plurality of light beams output from the Fourier-beam shapers 201. Thus, the output period of light beams may be increased compared to the case in which one frame image is formed using one light source and one Fourier-beam shaper. Thus, the load of a processor 300 may be reduced.

Figure 8:
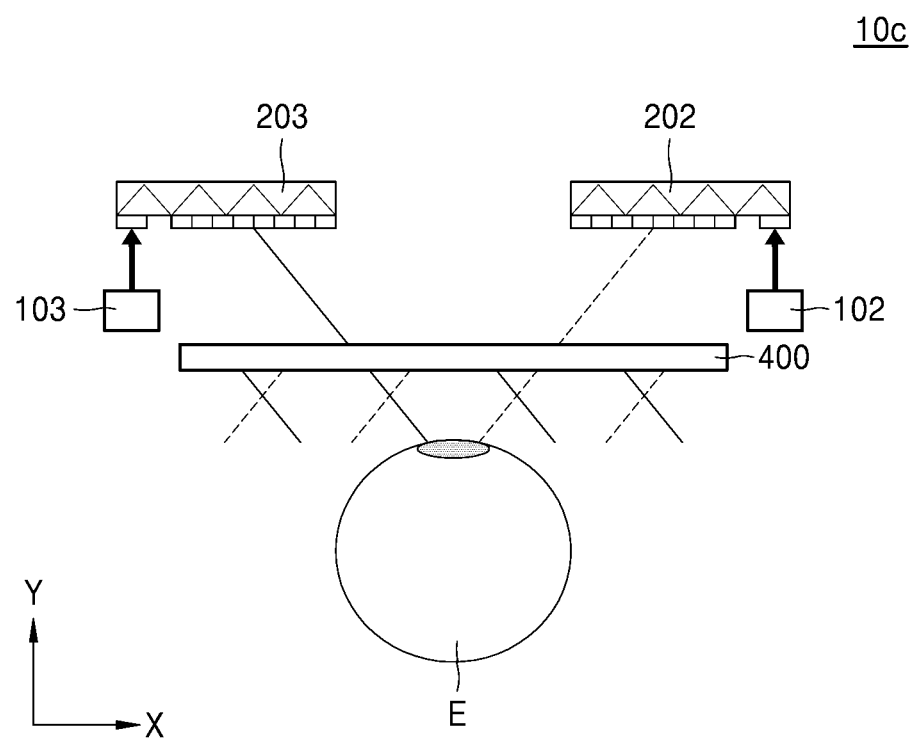
FIG. 8 is a view illustrating a display apparatus according to an example embodiment.

FIG. 8 is a view illustrating a display apparatus 10c according to another example embodiment.

The display apparatus 10c of FIG. 8 may include: a first beam output device 102 and a second beam output device 103 each outputting a plurality of light beams; a first Fourier-beam shaper 202 and a second Fourier-beam shaper 203 each forming a half frame image using the light beams output from the first beam output device 102 and the second beam output device 103, respectively. Since each of the first and the second Fourier-beam shapers 202 and 203 forms a half frame image to form one frame image, the output period of light beams may be increased compared to the case in which one frame image is formed using one light source and one Fourier-beam shaper.

With reference to FIGS. 7 and 8, it is described that each of the Fourier-beam shapers 202, and 203 forms a partial image of a frame image, such as a line frame image or a half frame image. However, this is a non-limiting example. Fourier-beam shapers and the beam output devices may be variously combined to form a partial image. For example, one frame image may be formed based on quarter frame images formed by four beam output devices and four Fourier-beam shapers.

The display apparatus 10c shown in FIG. 8 may further include an exit pupil expander 400. The exit pupil expander 400 may expand a light beam output from the first Fourier-beam shaper 202 and a light beam output from the second Fourier-beam shaper 203.

Figure 9:
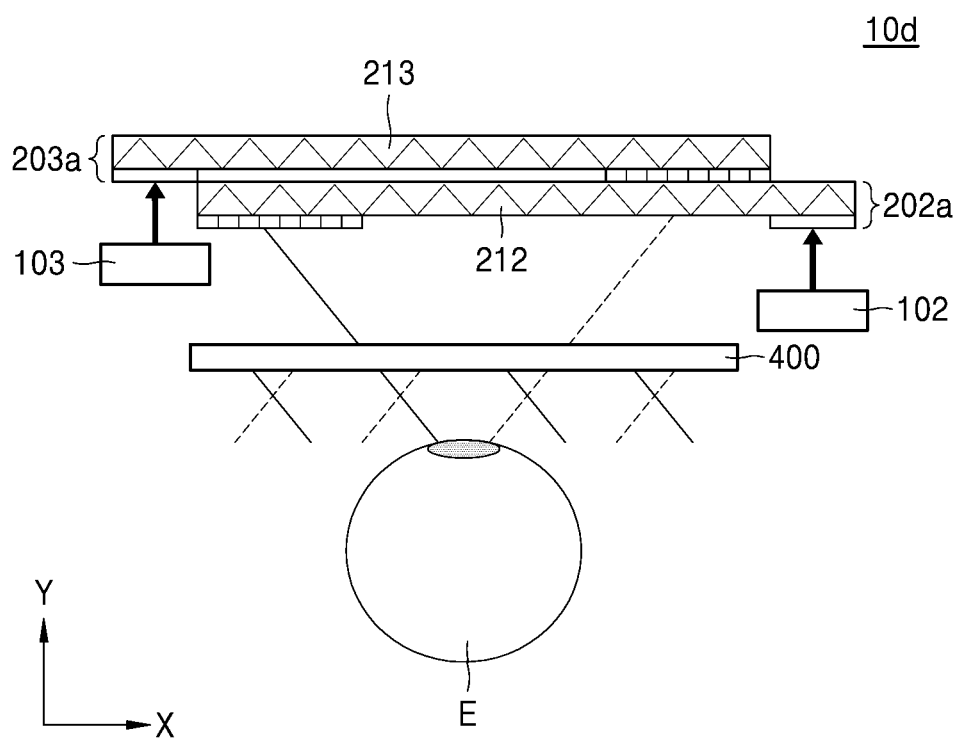
FIG. 9 is a view illustrating a portion of a display apparatus according to an example embodiment.

FIG. 9 is a view illustrating a portion of a display apparatus 10d according to another example embodiment.

Referring to FIG. 9, a first waveguide 212 of a first Fourier-beam shaper 202a, and a second waveguide 213 of a second Fourier-beam shaper 203a may partially overlap each other in a direction perpendicular to the length direction of the first and the second waveguides 212 and 213, for example, in an Y-axis direction. As the lengths of the first and the second waveguides 212 and 213 increase, the uniformity of light traveling in the first and the second waveguides 212 and 213 may increase.

The display apparatus 10d shown in FIG. 9 may further include an exit pupil expander 400 that may expand light beams output from the first Fourier-beam shaper 202a and the second Fourier-beam shaper 203a.

Figure 10:
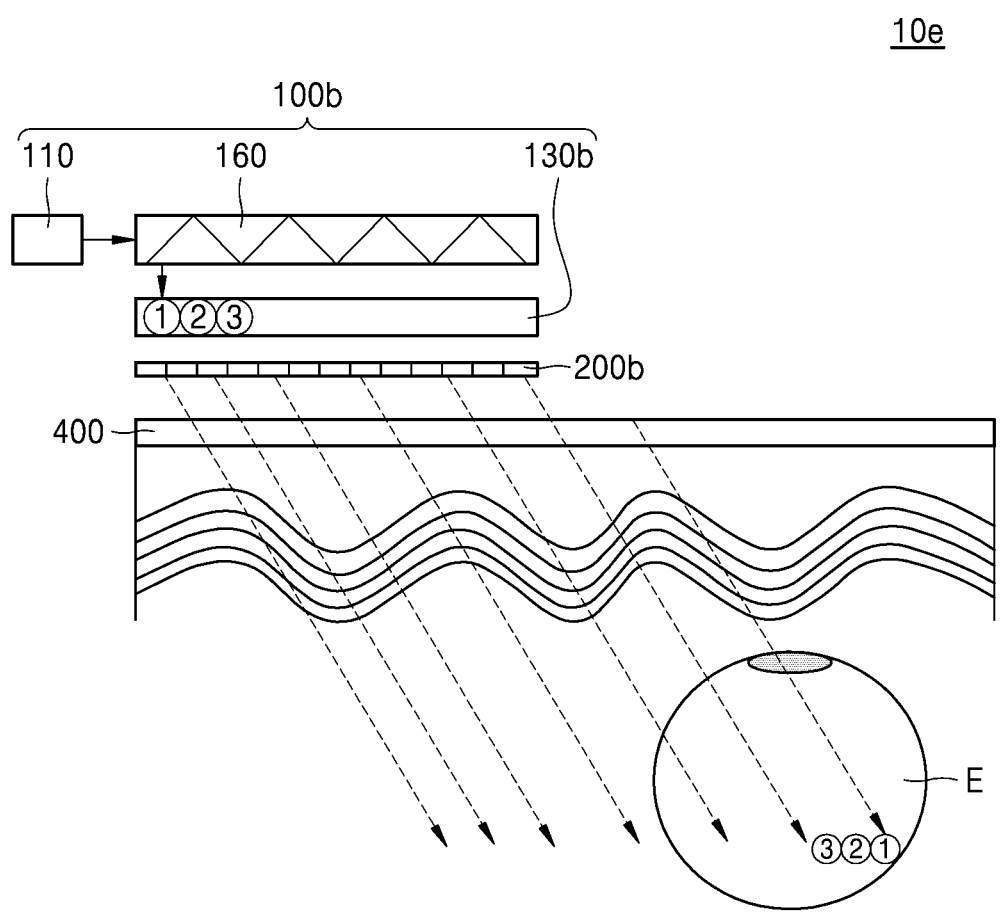
FIG. 10 is a view illustrating a display apparatus including a Fourier-beam shaper according to an example embodiment.

FIG. 10 is a view illustrating a display apparatus 10e including a Fourier-beam shaper 200b according to another example embodiment.

As shown in FIG. 10, a beam output device 100b may include a light source 110, a waveguide 160, and a spatial light modulator 130b. The beam output device 100b may output light corresponding to a frame image by using the waveguide 160 and the spatial light modulator 130b. The Fourier-beam shaper 200b may include a plurality of selective transmission elements ST. The selective transmission elements ST may have different directivities according to regions in which the selective transmission elements ST are positioned, and may thus direct incident light in different directions. When the beam output device 100b outputs light corresponding to a frame image, the selective transmission elements ST of the Fourier-beam shaper 200b may transmit light while directing the light in specific directions according to the optical characteristics of the selective transmission elements ST. Thus, the frame image may be formed in an external space.

The display apparatus 10e shown in FIG. 10 may further include an exit pupil expander 400 that may expand a light beam output from the first Fourier-beam shaper 200b.

In the above description, it is assumed that light having image information is incident on a Fourier-beam shaper, but example embodiments are not limited thereto. For example, image information may be added to light output from a Fourier-beam shaper, or a Fourier-beam shaper may include a spatial light modulator configured to add image information.

Figure 11:
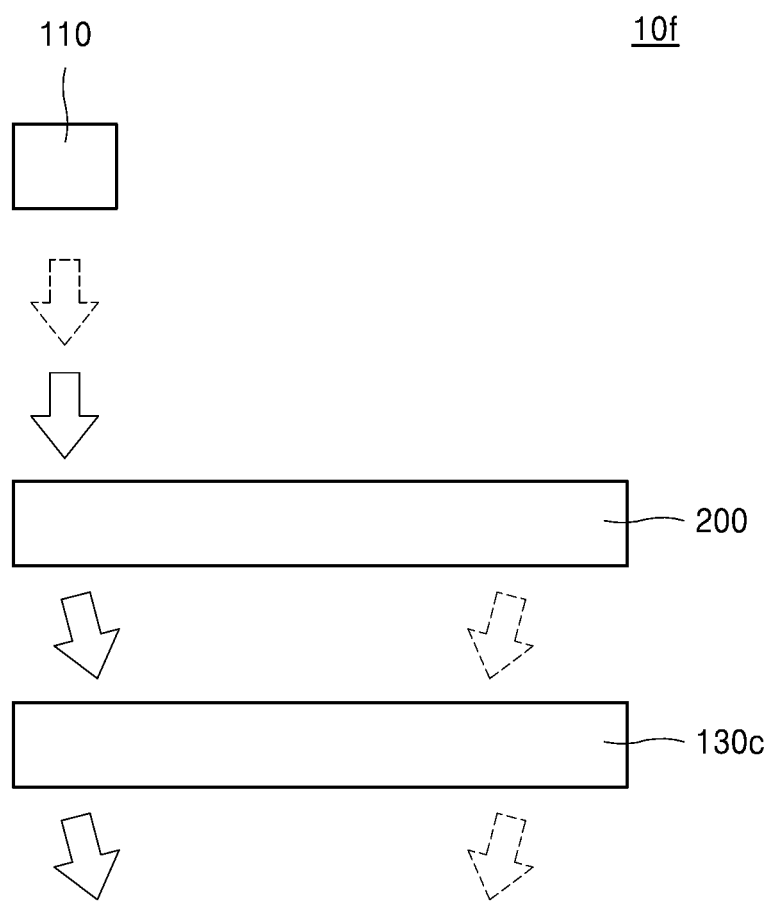
FIG. 11 is a schematic view illustrating a display apparatus configured to add an image to Fourier-transformed light according to an example embodiment.

FIG. 11 is a schematic view illustrating a display apparatus 10f configured to add an image to Fourier-transformed light according to another example embodiment.

As illustrated in FIG. 11, a Fourier-beam shaper 200 may output a plurality of light beams received from a light source 110 as spatially separated light beams, that is, Fourier-transformed light beams. The Fourier-beam shaper 200 may include a waveguide, an input coupler configured to direct a plurality of light beams into the waveguide, and a spatial converter configured such that the light beams traveling in the waveguide may be output through different regions of the spatial converter. The spatial converter may include a plurality of selective transmission elements such that the light beams traveling in the waveguide may be output through spatially different regions of the spatial converter. The selective transmission elements may be continuously arranged or discontinuously arranged.

Each of the selective transmission elements may transmit one of the light beams to the outside and may block the other of the light beams according to the optical characteristics of each selective transmission element. The selective transmission elements may include a plurality of diffraction members having different diffraction characteristics, or may include a plurality of optical particles of which optical characteristics are variable according to an electrical signal applied thereto. The structure of the Fourier-beam shaper 200 is substantially the same as the Fourier-beam shaper 200 described above, and thus a detailed description thereof will be omitted.

Light emitted from the light source 110 may not have image information, and the Fourier-beam shaper 200 may output the light not having image information to different spaces. In addition, a spatial light modulator 130c may add image information to the light output from the Fourier-beam shaper 200. The light output from the Fourier-beam shaper 200 is temporally and spatially separated light, and thus the spatial light modulator 130c may add image information to the temporally and spatially separated light which is incident thereon. Since light beams output from the spatial light modulator 130c are temporally and spatially separated sub-images, the display apparatus 10f of FIG. 11 may provide a frame image by focusing the sub-images.

Figure 12:
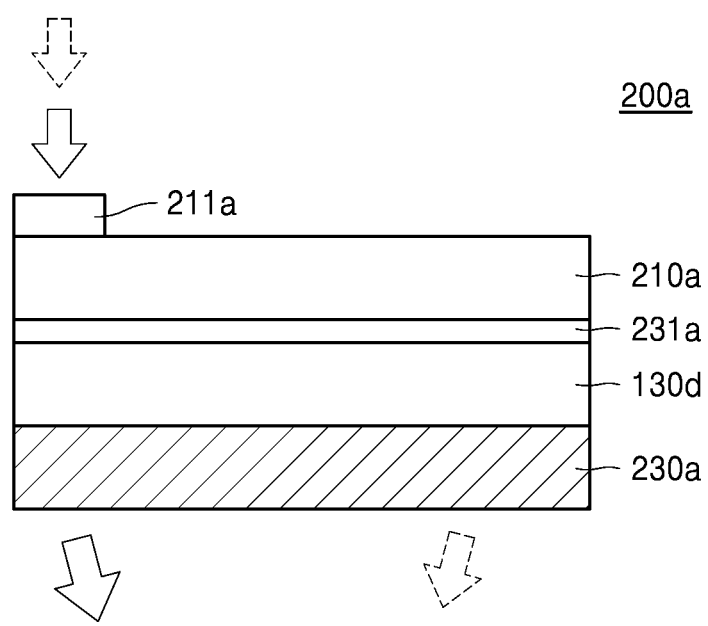
FIG. 12 is a view illustrating a Fourier-beam shaper including a spatial light modulator according to an example embodiment.

FIG. 12 is a view illustrating a Fourier-beam shaper 200a including a spatial light modulator 130d according to an example embodiment. As illustrated in FIG. 12, the Fourier-beam shaper 200a includes: a waveguide 210a and a spatial converter 230a that are apart from each other; and the spatial light modulator 130d that are arranged between the waveguide 210a and the spatial converter 230a. An input coupler 211a on which light is incident from a light source (not shown) may be arranged on the waveguide 210a, and an output coupler 231a through which light traveling in the waveguide 210a is output to the spatial light modulator 130d may be arranged on the waveguide 210a.

Light output from the waveguide 210a may be modulated by the spatial light modulator 130d to have image information. The light having image information, that is, image light, is incident on the spatial converter 230a. Selective transmission elements included in the spatial converter 230a may transmit a specific light beam (e.g., light beam having a specific incident angle) and may block the other light beams according to the optical characteristics of the selective transmission elements. The optical characteristics of the selective transmission elements may be variable according to an electrical signal applied thereto, or may not be variable. The optical characteristics may be diffraction characteristics, scattering characteristics, reflection characteristics, refraction characteristics, or the like.

According to an example embodiment, a display apparatus may be implemented as a single hardware device or a combination of a plurality of hardware devices. For example, the display apparatus may include: a slave including a light source unit and an optical scanner; and a master including a processor.

Figure 13:
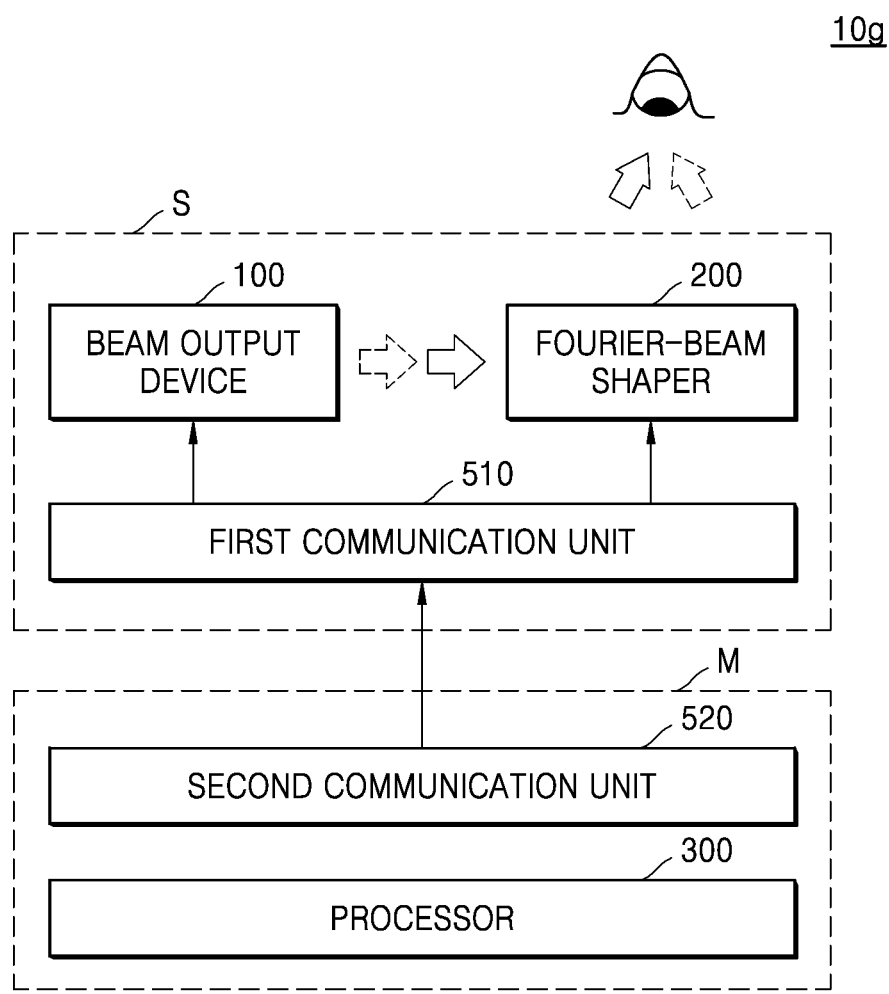
FIG. 13 is a block diagram illustrating a display apparatus according to an example embodiment.

FIG. 13 is a block diagram illustrating a display apparatus 10g according to another example embodiment.

Referring to FIG. 13, the display apparatus 10g may include: a slave S including a beam output device 100, a Fourier-beam shaper 200, and a first communication unit 510; and a master M including a second communication unit 520 and a processor 300. The beam output device 100 and the Fourier-beam shaper 200 have the same structures as those described above, and thus detailed descriptions thereof will be omitted. The slave S may be implemented as a wearable device such as a head mounted display apparatus, and the master M may be an electronic device such as a cellular phone or a computer which is separate from the wearable device.

The first and the second communication units 510 and 520 may provide control commands of the processor 300 to the beam output device 100 and the Fourier-beam shaper 200. The first and the second communication units 510 and 520 may include a short-range wireless communication unit, a mobile communication unit, or the like. The first and the second communication units 510 and 520 may communicate with each other by using various wired or wireless communication techniques such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, Wi-Fi communication, Radio Frequency Identification (RFID) communication, third generation (3G), fourth generation (4G), and fifth generation (5G) communications, and the like. However, these are merely examples and are not intended to be limiting.

A method of controlling the beam output device 100 and the Fourier-beam shaper 200 by using the processor 300 may be implemented as a software program including instructions stored in a computer-readable storage medium. A computer may read the instructions from the storage medium and may perform operations based on the read instructions according to embodiments, and may include the display apparatus of any one of the above-described embodiments. Examples of the computer-readable storage medium include a read only memory (ROM), a random access memory (RAM), a compact disc (CD)-ROM, a magnetic tape, a floppy disc, and an optical data storage. The computer-readable recording medium may be distributed over a plurality of computer systems connected to a network so that a computer-readable code is written thereto and executed therefrom in a decentralized manner. Functional programs, codes, and code segments needed for implementing the disclosure may be readily deduced by a person of ordinary skill in the art.

Although not illustrated in FIGS. 11 to 13, an exit pupil expander may be arranged to expand light corresponding to an image in one direction.

Figure 14:
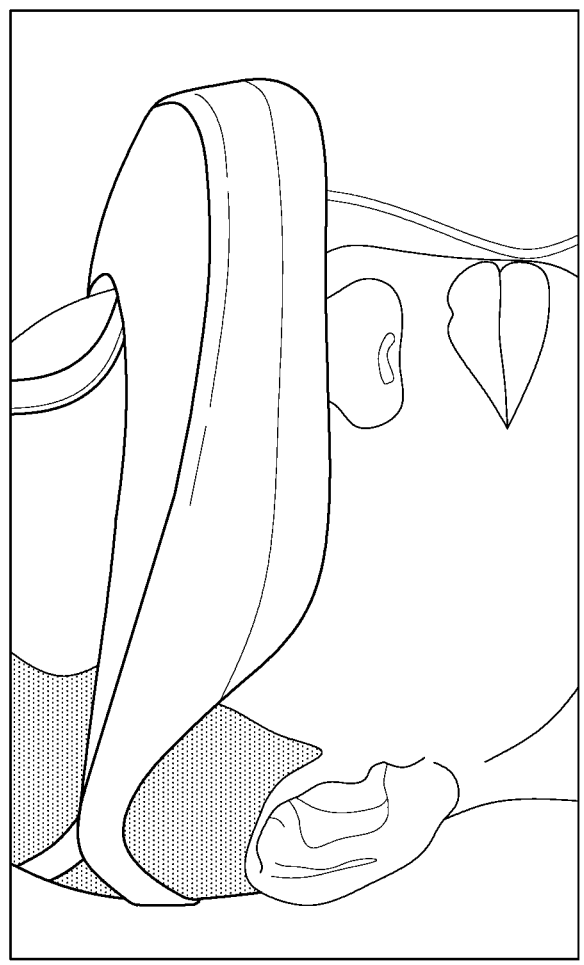
FIG. 14 is a view illustrating an electronic device to which a display apparatus is applied according to an example embodiment.
Figure 15:
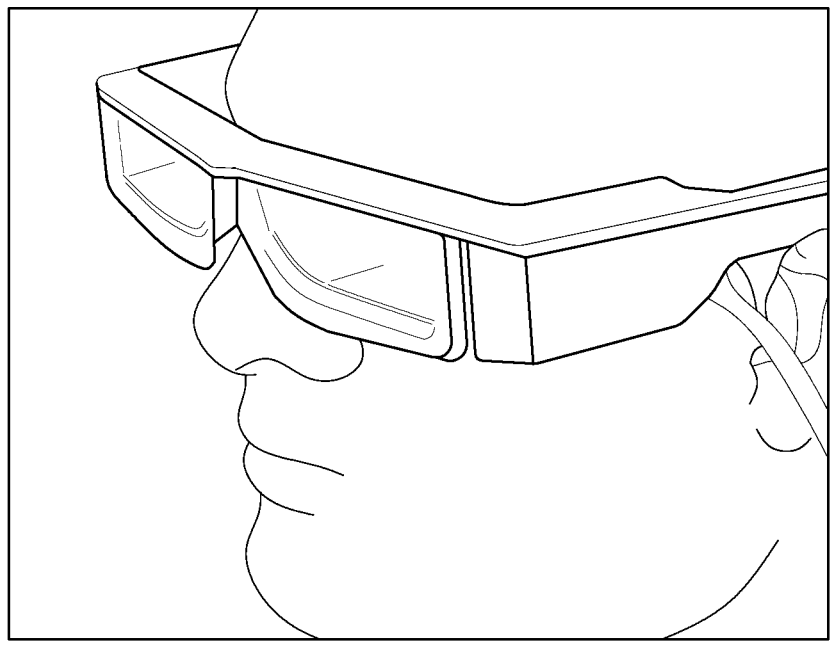
FIG. 15 is a view illustrating an electronic device to which a display apparatus is applied according to an example embodiment.

Any one of the display apparatuses 10, 10a, 10b, 10c, 10d, 10e, 10f, and 10g, and the Fourier-beam shapers 200 and 200a may be used as a component of a wearable device. For example, any one of the display apparatuses 10, 10a, 10b, 10c, 10d, 10e, 10f, and 10g may be applied to head mounted displays (HMDs). In addition, any one of the display apparatuses 10, 10a, 10b, 10c, 10d, 10e, 10f, and 10g may be applied to glasses-type displays or goggle-type displays. Wearable electronic devices may operate in an interacting relationship with (or in connection with) smartphones. FIGS. 14 and 15 are views illustrating electronic devices to which the display apparatuses of the example embodiments may be applied.

While the Fourier-beam shapers and the display apparatuses including the Fourier-beam shapers have been described according to the example embodiments with reference to the accompanying drawings, the descriptions are provided for illustrative purposes only, and it will be understood by those of ordinary skill in the art that various changes and other equivalent embodiments may be made therefrom.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

It should be understood that example embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. A Fourier-beam shaper comprising:
    a beam output device without lens configured to time-sequentially output a plurality of light beams corresponding to a frame image such that the plurality of light beams proceed in different traveling paths, each of the plurality of light beams corresponding to a partial image of the frame image, wherein the beam output device comprises a first beam output device configured to time-sequentially output first light beams corresponding to a first sub-frame image of the frame image, and a second beam output device, separate from the first beam output device, and configured to time-sequentially output second light beams corresponding to a second sub-frame image of the frame image;
    a waveguide comprising a first waveguide, in which the first light beams travel, and a second waveguide, in which the second light beams travel;
    a first input coupler configured to time-sequentially direct the first light beams toward the first waveguide;
    a second input coupler configured to time-sequentially direct the second light beams toward the second waveguide;
    a first spatial converter configured to time-sequentially output the first light beams traveling in the first waveguide through spatially different regions of the first spatial converter; and
    a second spatial converter configured to time-sequentially output the second light beams traveling in the second waveguide through spatially different regions of the second spatial converter,
    wherein the first waveguide and the second waveguide partially overlap each other in a direction perpendicular to a length direction of the first waveguide and the second waveguide, the first input coupler and the second input coupler do not overlap each other in the direction, and the first spatial converter and the second spatial converter do not overlap each other in the direction.

2. The Fourier-beam shaper of claim 1, wherein at least one of the first spatial converter and the second spatial converter is further configured to output the plurality of light beams in a plurality of specific directions.

3. The Fourier-beam shaper of claim 1, wherein at least one of the first spatial converter and the second spatial converter is further configured to output at least two of the plurality of light beams in different directions.

4. The Fourier-beam shaper of claim 1, wherein at least one of the first spatial converter and the second spatial converter comprises a plurality of selective transmission elements arranged in a first direction, the first direction crossing directions in which the plurality of light beams are output, and
wherein each of the plurality of selective transmission elements is configured to transmit one of the plurality of light beams to an external space and not to transmit remaining light beams of the plurality of light beams to the external space.

5. The Fourier-beam shaper of claim 4, wherein each of the plurality of selective transmission elements is further configured to selectively transmit the plurality of light beams according to an optical characteristic of each of the plurality of selective transmission elements.

6. The Fourier-beam shaper of claim 5, wherein the optical characteristic comprises a diffraction characteristic.

7. The Fourier-beam shaper of claim 5, wherein at least one of a grating structure and a material of at least two of the plurality of selective transmission elements are different from each other.

8. The Fourier-beam shaper of claim 5, wherein each of the plurality of selective transmission elements is further configured to selectively transmit the plurality of light beams according to an electrical signal applied to each of the plurality of selective transmission elements.

9. The Fourier-beam shaper of claim 1, wherein at least one of the first input coupler and the second input coupler is further configured to direct the plurality of light beams that are incident on the at least one of the first input coupler and the second input coupler at different incident angles.

10. The Fourier-beam shaper of claim 1, wherein at least one of the first spatial converter and the second spatial converter is further configured to output the plurality of light beams through the spatially different regions of the at least one of the first spatial converter and the second spatial converter based on incident angles of the plurality of light beams.

11. The Fourier-beam shaper of claim 1, wherein at least one of the first spatial converter and the second spatial converter is further configured to focus the plurality of light beams respectively at different positions in an external space.

12. The Fourier-beam shaper of claim 11, wherein the frame image is provided to a user based on the focused plurality of light beams.

13. The Fourier-beam shaper of claim 1, wherein each of the plurality of light beams corresponds to a pixel image of the frame image.

14. The Fourier-beam shaper of claim 1, wherein sizes of the plurality of light beams output from the first spatial converter and the second spatial converter are different from sizes of the plurality of light beams incident on the first input coupler and the second input coupler.

15. The Fourier-beam shaper of claim 14, wherein the sizes of the plurality of light beams output from the first spatial converter and the second spatial converter are greater than the sizes of the plurality of light beams incident on the first input coupler and the second input coupler.

16. The Fourier-beam shaper of claim 1, wherein the first light beams and the second light beams are synchronously and respectively incident on the first input coupler and the second input coupler.

17. The Fourier-beam shaper of claim 1, wherein the first spatial converter is further configured to form the first sub-frame image in a first region of an external space, and the second spatial converter is further configured to form the second sub-frame image in a second region of the external space, the second region being different from the first region.

18. The Fourier-beam shaper of claim 17, wherein the first sub-frame image and the second sub-frame image correspond to different portions of the frame image.

19. A display apparatus comprising:
a Fourier-beam shaper, comprising:
a beam output device without lens configured to time-sequentially output a plurality of light beams corresponding to a frame image such that the plurality of light beams proceed in different traveling paths, each of the plurality of light beams corresponding to a partial image of the frame image, wherein the beam output device comprises a first beam output device configured to time-sequentially output first light beams corresponding to a first sub-frame image of the frame image, and a second beam output device, separate from the first beam output device, and configured to time-sequentially output second light beams corresponding to a second sub-frame image of the frame image;
a waveguide comprising a first waveguide, in which the first light beams travel, and a second waveguide, in which the second light beams travel;
a first input coupler configured to time-sequentially direct the first light beams toward the first waveguide;
a second input coupler configured to time-sequentially direct the second light beams toward the second waveguide;
a first spatial converter configured to time-sequentially output the first light beams traveling in the first waveguide through spatially different regions of the first spatial converter; and
a second spatial converter configured to time-sequentially output the second light beams traveling in the second waveguide through spatially different regions of the second spatial converter; and
a light source configured to output the plurality of light beams to the Fourier-beam shaper,
wherein the first waveguide and the second waveguide partially overlap each other in a direction perpendicular to a length direction of the first waveguide and the second waveguide, the first input coupler and the second input coupler do not overlap each other in the direction, and the first spatial converter and the second spatial converter do not overlap each other in the direction.

20. The display apparatus of claim 19, further comprising an exit pupil expander configured to expand the plurality of light beams output from the Fourier-beam shaper.

21. The display apparatus of claim 20, wherein the exit pupil expander is further configured to transmit light corresponding to a reality environment.

22. The display apparatus of claim 19, further comprising a spatial light modulator configured to add image information to the plurality of light beams output from the Fourier-beam shaper or the light source.

23. The display apparatus of claim 19, further comprising a direction adjustment member configured to adjust incident angles of the plurality of light beams incident on the Fourier-beam shaper.

\* \* \* \* \*